Oct. 29, 1929.  G. H. HARTMAN  1,733,345
BAG FILLING APPARATUS
Filed July 16, 1928  8 Sheets-Sheet 4

INVENTOR
George H Hartman

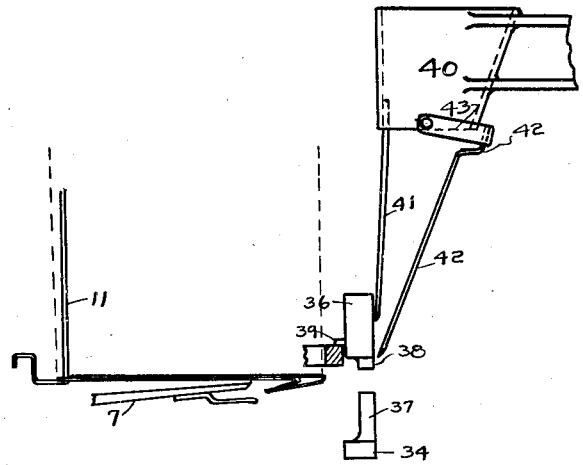
Fig 10
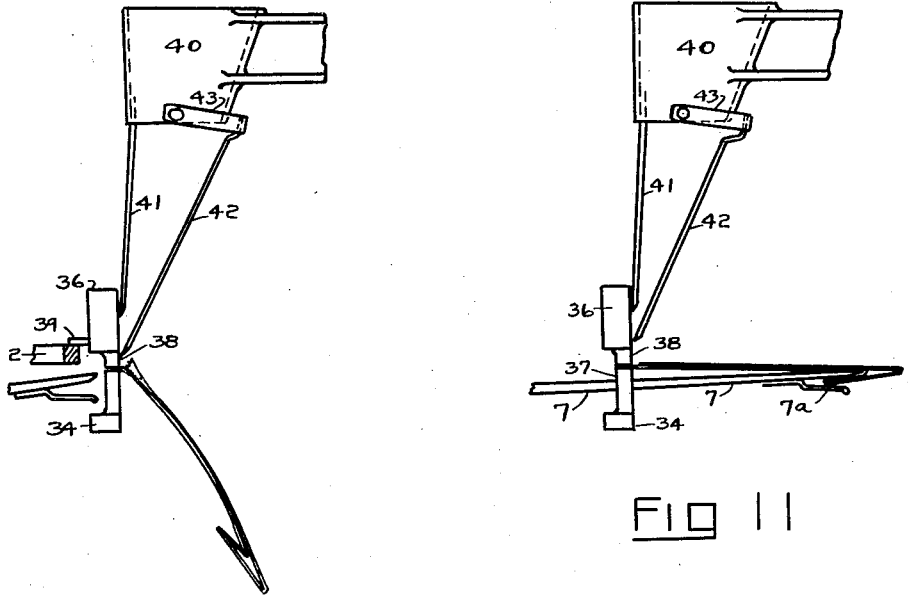
Fig 12
Fig 11
INVENTOR
George H Hartman

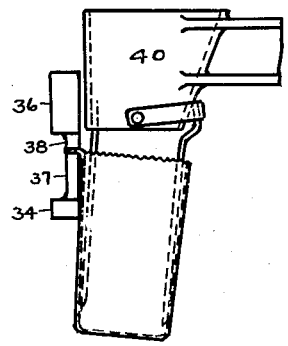
Fig 14
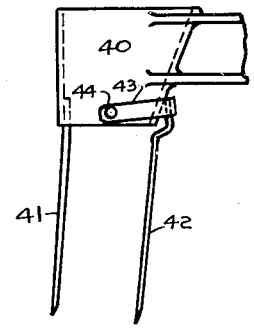
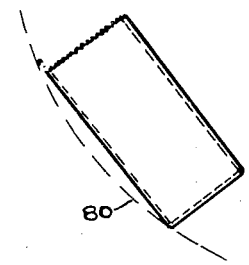
Fig 15
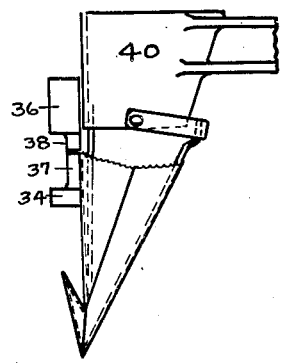
Fig 13
INVENTOR
George H. Hartman

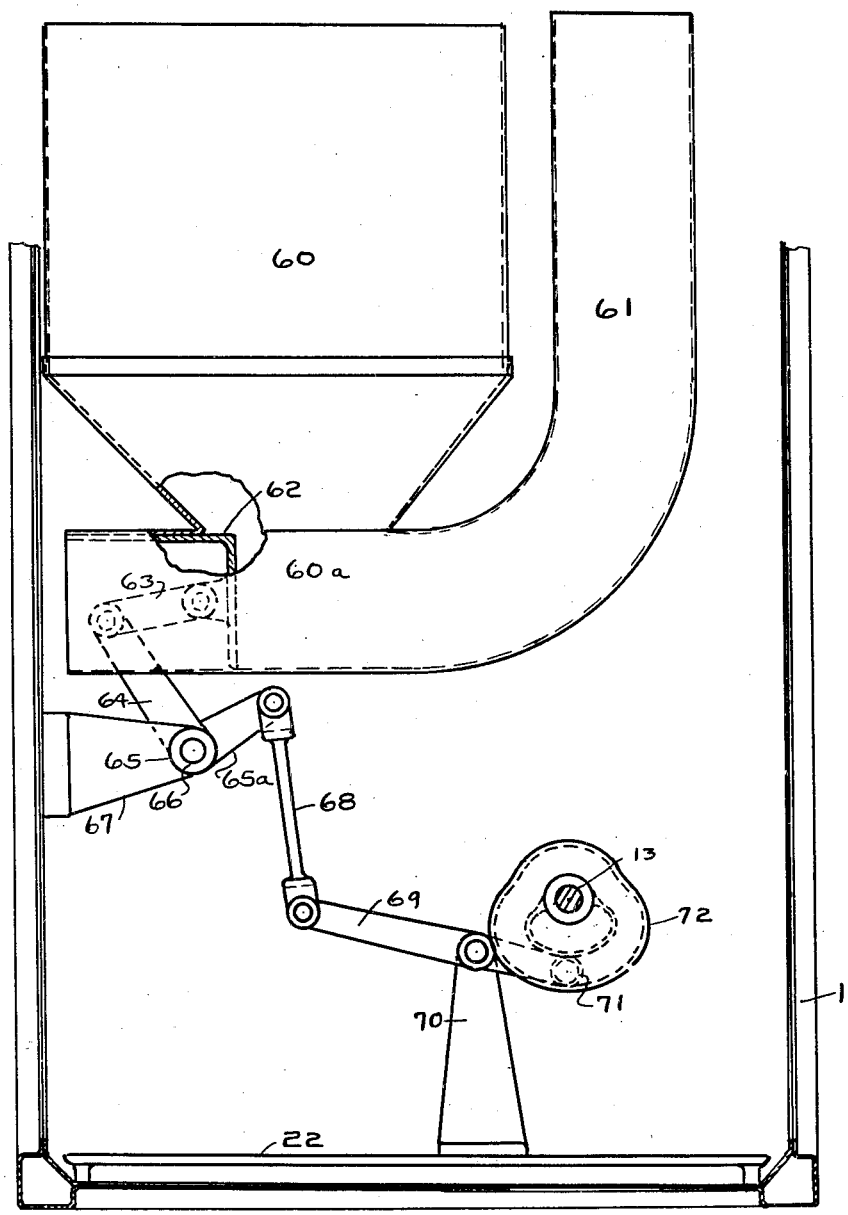

Patented Oct. 29, 1929

1,733,345

UNITED STATES PATENT OFFICE

GEORGE H. HARTMAN, OF CLEVELAND, OHIO

BAG-FILLING APPARATUS

Application filed July 16, 1928. Serial No. 292,995.

My invention relates to a method of and apparatus for handling and opening bags, such as the conventional paper bag, to permit them to be filled with any suitable material and subsequently delivered to the purchaser. In the present instance I have shown mechanism for handling and opening bags to be filled with pop corn by the means described and disclosed in my application for United States Letters Patent under Serial No. 608,114. It is evident, however, that this method of filling the bags is shown merely by way of illustration, and that the mechanism may be used to open bags to enable their filling by other means, with material other than pop corn.

One object of my invention is to provide improved bag handling and opening mechanism operating according to an improved method and adaptable for automatically opening the plain conventional type of folded paper bag and for positioning the bag for filling the same with any commodity, such as popcorn, coffee, sugar or other material.

Another object of my invention is to utilize opening mechanism which operates by an improved method which does not tear the bag, and which automatically feeds bags from a stack thereof.

Another object of the invention is to utilize inherent structural features of the great majority of folded paper bags, the bottom portion of which is folded to present an edge suitable for feeding the bag, and in which the top edge of one side extends above the edge of the other side, enabling the bag to be gripped by the extended lip or edge during the opening process.

Further objects and advantages of the invention are apparent from the following detailed description.

While the invention in its broader aspect is capable of embodiment in different forms, a preferred embodiment thereof, and of the mechanism forming the same are illustrated in the accompanying drawings, in which,—

Figures 10 to 15 inclusive are diagrammatic views of the bag opening and delivering mechanism in different operative positions during the working of the process.

Figure 16, is an elevation of other side of the mechanism with parts broken away and in section, and with bag opening mechanism not shown.

Figure 2:
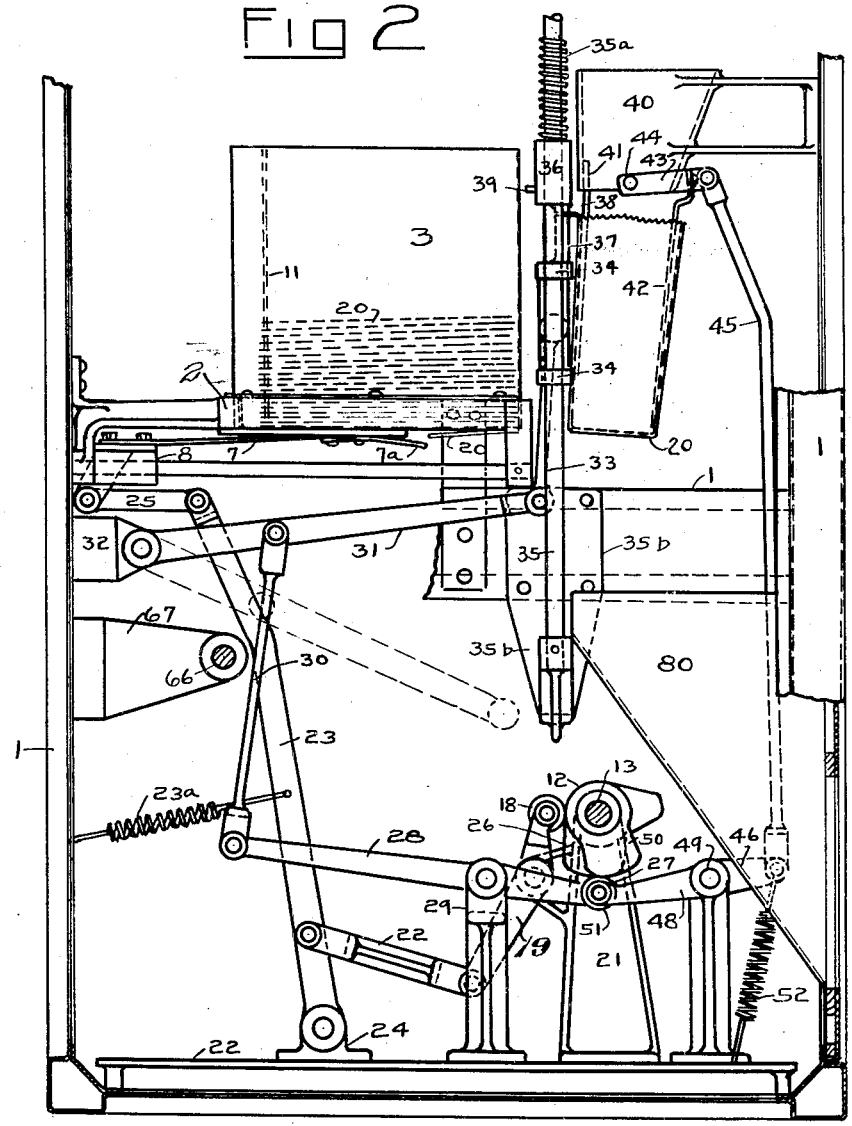
Figure 2, is a sectional elevation taken along the line BB in Figure 1.
Figure 4:
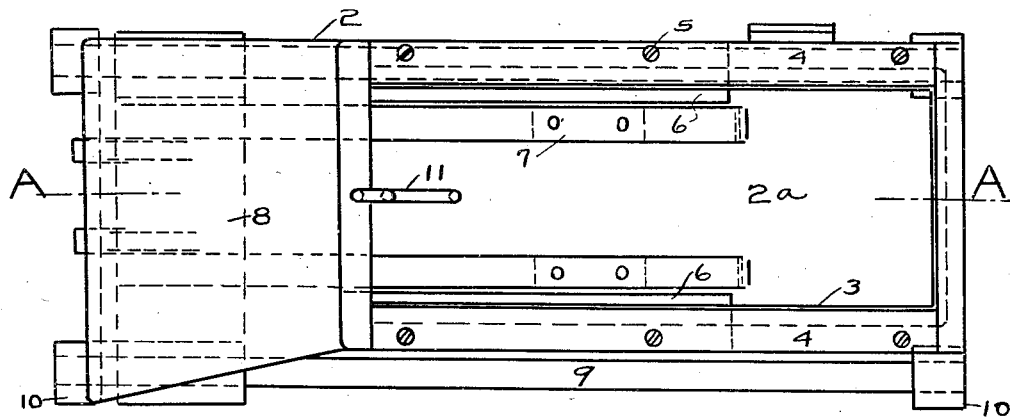
Figure 4, is an enlarged plan view of the bag holder.
Figure 5:
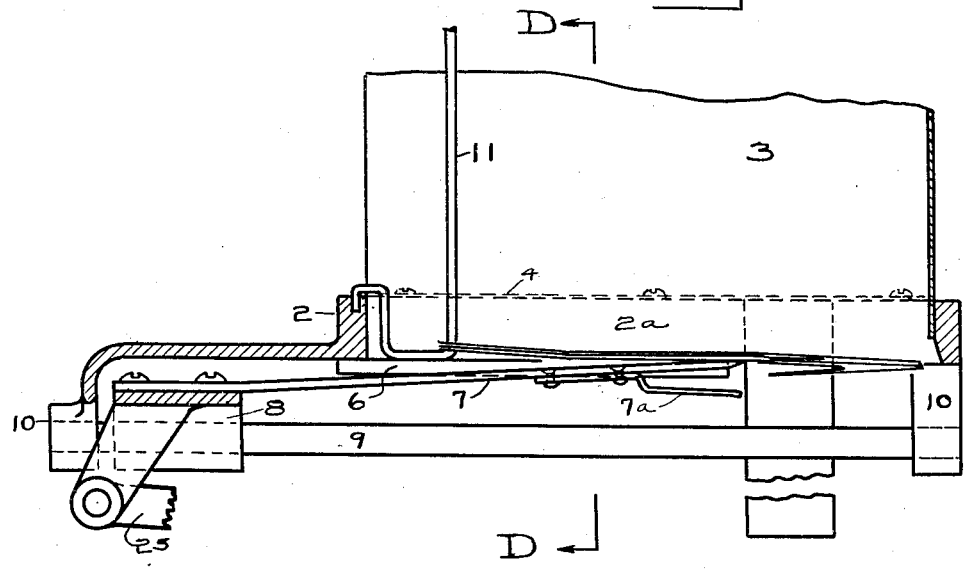
Figure 5, is a cross section of the bag holder taken along the line AA in Figure 4, with parts broken away.
Figure 6:
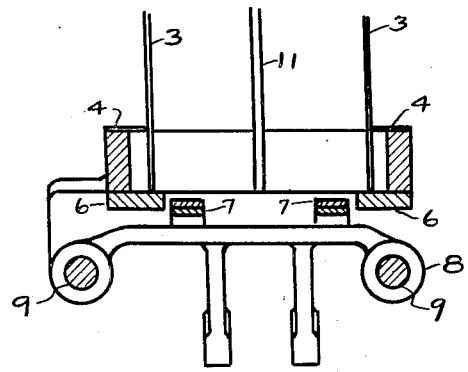
Figure 6, is a cross section of the bag holder, taken along the line DD in Figure 4.
Figure 8:
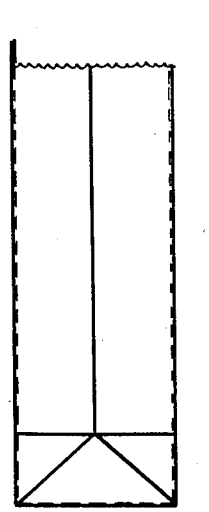
Figure 8, is a side view of the bag shown in Figure 7, shown in full open position.

Referring to the drawings, 1 designates a case of suitable construction to hold the operating portions of the mechanism, in the present instance it being shown in conventional sheet steel design. Inasmuch as this case forms no part of the invention it is not here further disclosed or described. A bag holder 2, Figures 2, 4 and 5, is carried by one side of the case 1. This bag holder is preferably a casting and contains a rectangular hole $2^a$ in its center portion, the hole being of sufficient size to permit a bag to pass therein as is hereinafter more fully described.

To enable the carrying of a large number of bags in the bag holder, I have provided in the present instance a sheet steel container 3 rising vertically from the cast portion of the bag holder and in central spaced relation with the hole therein, the said container being adapted to carry a stack of bags and also adapted to permit the bags to slide downward into contact relation with the feeding mechanism of the bag holder, hereinafter disclosed. This container 3 is held in a central spaced relation to the hole 2ª by being in contact relation with the walls at the ends of the hole, and by being guided on its two longitudinal sides by the flat strips 4, which strips are fastened in a suitable manner, and in the present instance by the screws 5, to the respective top edges of the bag holder 2. Two bag supporting strips 6 are bolted or otherwise fastened to the under side of the bag holder, and serve to support the under side of the stack of bags in the container 3. The front ends of these strips 6 are stopped off at a sufficient distance from the bottom ends of the bags so that the weight of the stack of bags in the container will cause the bottom ends of the bags to hang downward and the folded or collapsed bottom of the lowermost bag 20 to tend to gap open as shown in Figure 5. This gapping open of the folded or collapsed bottom of the bag serves to aid that part of the process wherein the bags are fed one by one from the bottom of the stack, as is hereinafter disclosed more fully.

Figure 7:
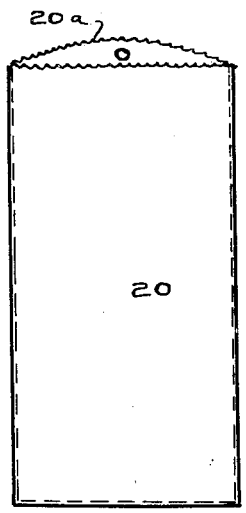
Figure 7, is a front view of a typical folded paper bag of a design common in the art to which the invention appertains, and which design enables serving the purpose of the process.

For the purpose of feeding the bags one by one from the stack in the container 3, I have provided two fingers 7, Figure 5, and 4, carried on a crosshead 8, the crosshead and associated fingers 7 being mounted for horizontal reciprocatory movement in the bag holder 2, and being guided on the lower side thereof by the guide rods 9. These guide rods 9 are supported at each of their ends by the downwardly projecting bosses 10 of the bag holder 2. It is evident that upon a forward movement of the crosshead 8 the fingers 7 engage with the gapped open collapsed bottom portion of the lower bag in the container 2, which is then pushed horizontally outward from the stack of bags in the container. To prevent more than a single bag from being pulled out I have provided in the present instance a bent wire 11, Figures 4 and 5, onto which the bags are strung, utilizing for this purpose a hole that is punched into the extended side or lip of the bag, as shown in Figure 7.

Figure 1:
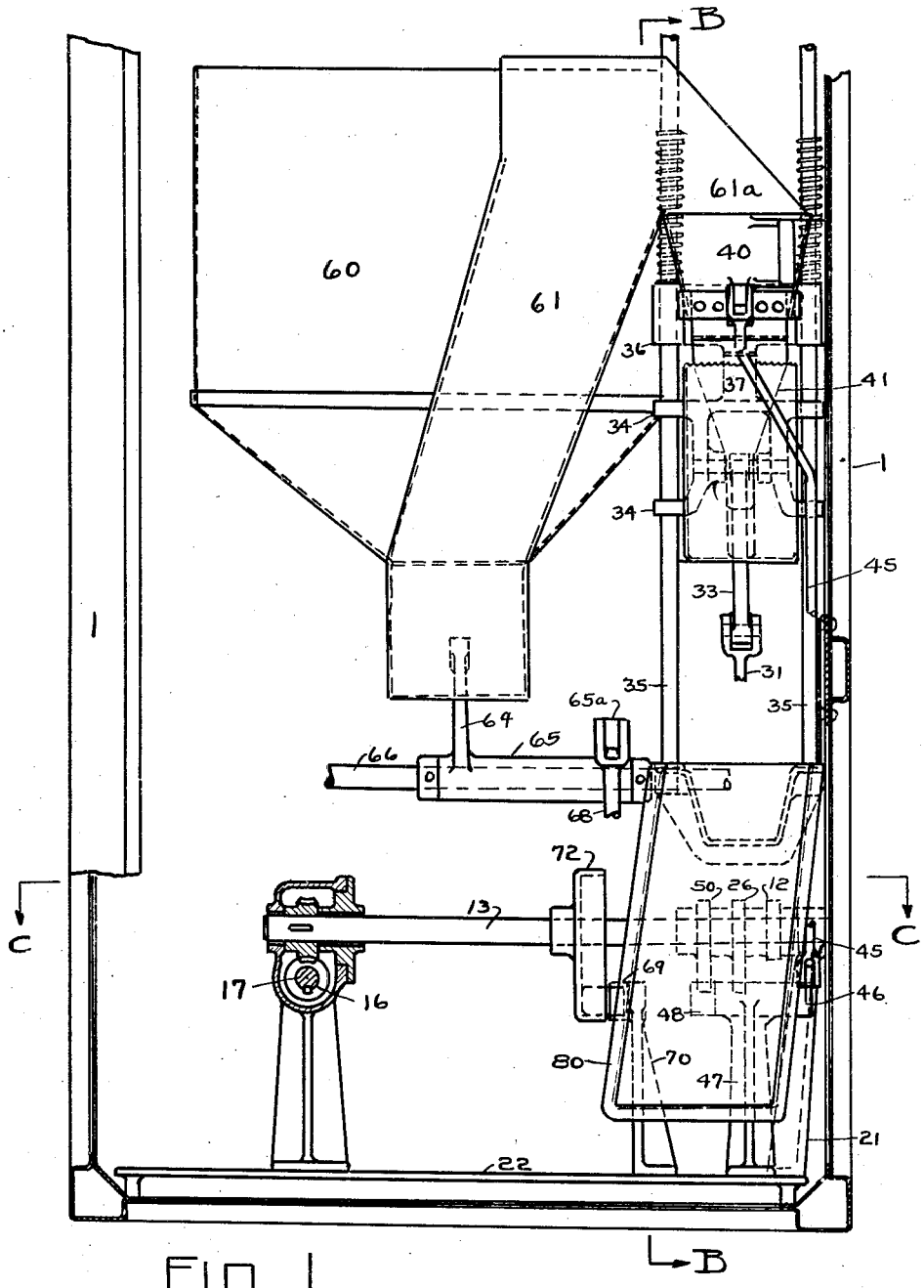
Figure 1 is an elevation of one side of the mechanism, with parts broken away and in section.
Figure 3:
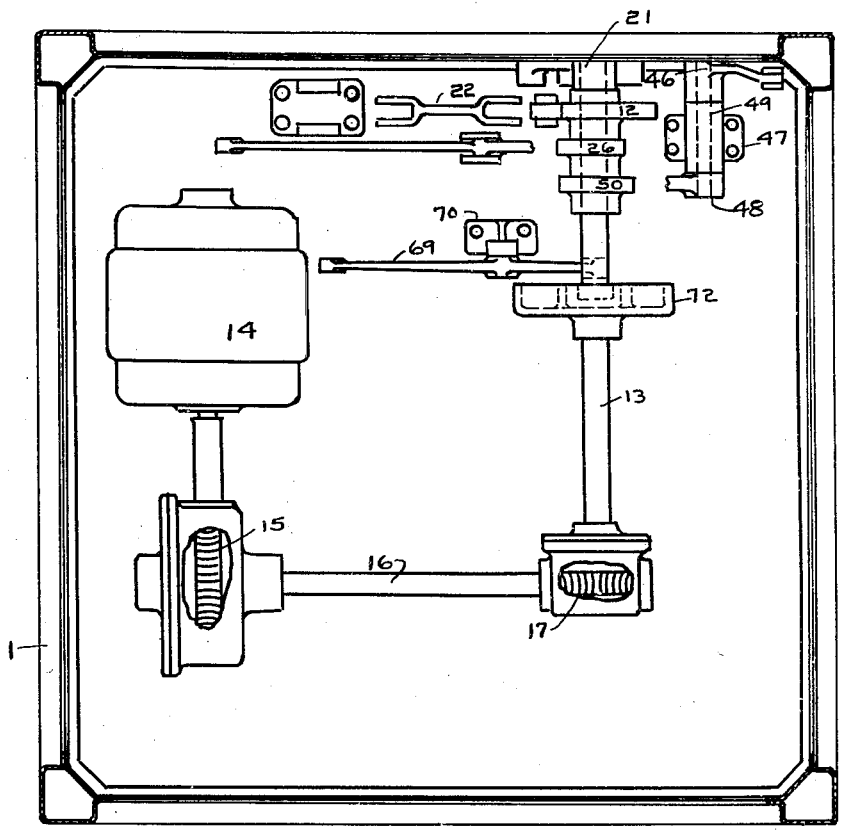
Figure 3, is a plan view of the drive mechanism taken along the line CC in Figure 1.

The crosshead 8 receives its reciprocatory movement from a cam 12, Figures 1, 2 and 3, which is keyed to a shaft 13, which receives its turning movement from a motor 14, through the worm gear reductions 15 and 17, and the shaft 16. In contact relation with the cam 12 is a roller 18, Figure 1, located at one end of a lever 19. This lever 19 is pivoted upon an outstanding boss of a bracket 21, which bracket rises vertically from a floor plate 22. The opposite end of the lever 19 is connected by means of a link 22 to a boss intermediate the ends of the lever 23. The lower end of the lever 23 is pivoted to a bearing in the bracket 24, and its upper end is connected to a downwardly extending boss of the crosshead 8 by means of a link 25.

It is now evident that upon a turning of the motor 14 and the cam 12 each revolution of the cam will cause the fingers 7 to pass from one extreme position to the other extreme and then return, and in so doing each time will select one bag from the under side of the stack of bags in the bag holder and move it to a predetermined position outside of the bag holder. As a means of returning the lever 23 and the fingers 7 to the starting position shown in Figure 2, I have provided a coil contractile spring 23ª extended from the lever to a suitable connection on the case 1. It is also evident that if the spring is not desired cam 12 may be of the return motion type, so that both strokes are positive in action.

Located and keyed upon the shaft 13 is a second cam 26, Figures 2 and 3, in contact relation with a roller 27 located at one end of the lever 28. This lever 28 is pivoted intermediate its ends to a bracket 29, Figure 2, and at its other end to one end of a link 30. The other end of the link 30 is connected to a lever 31, at a point intermediate its ends, which lever 31 is pivoted at one end to a bracket 32. It is evident that a full rotation of the cam 26 through one revolution will cause the lever 31 to lower from the full line position shown in Figure 2, into the postion shown by dotted lines, and then return from the dotted position back to the full line position. Connected to the other end of the lever 31 is one end of a link 33, the other end of the link being connected to a boss in the central portion of a crosshead 34, Figure 1. This crosshead is mounted for vertical reciprocatory movement upon a pair of vertical parallel spaced guide rods 35, extending from a bracket 35ᵇ to convenient portions of the frame. A second crosshead 36 is mounted upon the guide rods 35 above the crosshead 34.

An upwardly extending boss 37 extending from the top side of the crosshead 34 is arranged to be in contact relation at predetermined positions of the crosshead 34 on the guide rods 35, with a similar but downwardly extending boss 38 of the crosshead 36. The movement downward of the crosshead 36 is limited by the pin 39 located upon the back side thereof coming into contact with the front edge of the bag holder casting 2.

Figure 9:
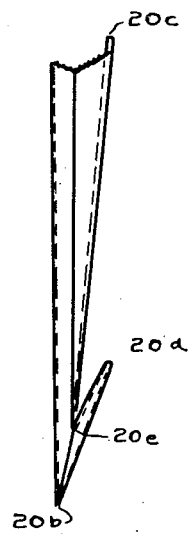
Figure 9 is a side view of the bag shown in part closed position.

The operation of this portion of the device is as follows: When a single bag has been pushed from the bag holder 2 by the fingers 7 to the position shown in Figure 11, the cam 26 causes the crosshead 34 to rise so as to bring the top edge of the boss 37 into contact relation to the lower edge of the boss 38 of the crosshead and pinch or clamp the extended lip or edge 20ª of the bag between them. The two crossheads 34 and 36 then dwell in this clamping position until the fingers 7 recede to the position shown in Figure 12, during which recession the bag drops into the position shown in Figure 12, being held in this position by the gripping action of the two bosses 37 and 38 on its lip. To enable the fingers 7 to pull the bag from engagement with the wire 11, I have provided the supplemental fingers 7ᵃ which prevent the flap 20ᵈ of the collapsed bottom of the bag from turning downward and releasing the bag from the fingers, during this said pulling movement of the fingers. It is also evident that to enable the bosses 37 and 38 to grip only the extended lip portion 20ᵃ of the bag the distance from point 20ᵇ to 20ᵉ of the bag must always be substantially constant. See Figure 9.

A stationary spout 40 is mounted upon a portion of the case 1, Figures 10 and 11, and carries in fixed position at its back side a preferably tapered steel blade 41, which blade is located in a fixed position and relation to the guide rods 35. A second preferably tapered steel blade 42 is fastened by rivets to an arm 43 which arm is yoked over the lower end of the spout 40 and is pivoted thereto at each side at 44. An outstanding boss is located centrally of this yoked arm 43 and is connected to a control rod 45, which rod receives vertical reciprocatory movement from a lever 46. The lever 46 is pinned or otherwise fastened to a shaft 49 journaled in a bracket 47 rising upward from the base plate 22. A second lever 48 is mounted upon the other end of the shaft 49, and on the opposite side of the bracket 47, and has its end fitted with a roller 51, which roller is held in contact relation with the face of a cam 50 by means of a coil contractile spring 52, extending from the end of the lever 46 to a suitable location on the base plate 22. It is evident that upon a movement of the cam 50 the resultant vertical movement of the roller 51 is transferred into vertical reciprocatory movement of the rod 45, and that upward movement of the rod 45 brings the steel blade 42 from the position shown in Figure 10 to the position shown in Figure 15. It is also evident that as this movement is timed in predetermined relation to the movement of the crossheads 34 and 36, it will serve the function of opening the bag after the vertical movement of the crosshead 34 has elevated the bag into the position shown in Figure 13.

As a means of filling the bag with material I have shown in the present instance as aforementioned the means employed to deliver measured quantities of popped corn as disclosed in my aforementioned application for United States Letters Patent. In this means I have used (Figures 1 and 16) a hopper 60 with its downwardly extending side walls, terminating in and forming a rectangular measuring cup 60ᵃ, and provided with a hollow tubular spout 61 extending upward from the measuring cup 60ᵃ, and terminating in an outlet passage 61ᵃ, in fixed connecting relation to the spout 40. The measuring cup 60ᵃ has its walls also extending rearward, to form a guideway for a plunger 62. It is evident that popped corn disposed within the hopper 60 will fall by gravity into the measuring cup, and that upon a forward movement of the plunger 62, the corn in the cup will be pushed up and into the spout 61, overflowing therefrom into spout 40.

As a means of imparting movement to the plunger I have shown in the present instance a cam 72, keyed in a fixed position on the shaft 13. A lever 69 is fitted with a roller 71 at one end, which roller engages with the path in the cam 72. The lever 69 is pivoted intermediate its ends on the bracket 70 which rises from the base plate 22. To the other end of the lever 69 is fastened one end of a link 68, the other end of the link being fastened to an outwardly extending arm 65ᵃ of the bell crank 65. An upwardly extending arm 64 extends from the center hub of the bell crank to a pin connection with one end of a link 63. The other end of the link 63 is connected to the plunger 62.

It is evident that a movement of the cam 72 through one revolution will cause the plunger to go from one extreme to the other of its two extreme positions, thereby delivering one measured charge of material into the spout 40 for each revolution of the cam 72. The bellcrank 65 is pivoted on the shaft 66 journaled in the brackets 67 one of which brackets is bolted to each side of the case 1. Inasmuch as this delivery means forms no part of the present invention and as it is completely described and disclosed in the aforementioned application for Letters Patent, it has not been thought necessary to describe it further or to show it more fully.

The operation of the mechanism is as follows: A desired predetermined number of paper bags is placed in the bag holder 2, and the desired amount of material into the hopper 60. Motor 14 being started, the fingers 7 will engage the lower bag of the stack in the bag holder and push it from the stack out and into the position shown in Figure 11, coincident with the fingers 7 reaching their outermost position shown in Figure 11, the crosshead 34 is elevated a portion of its vertical movement by the cam 26, causing the projecting edge of the paper bag to be caught between the edges of the bosses 37 and 38. The vertical movement of the crosshead is so timed on the cam 26 that it will dwell in the position shown in Figure 11 until the cam 12 has revolved a sufficient distance to bring the fingers 7 back to substantially the position shown in Figure 12, at which time the cam 26 starts the crosshead 34 to again rise vertically, thereby compressing the coil contractile spring 35ᵃ, and raising the crosshead 36, until the position shown in Figure 13 is reached. Inasmuch as the extended edge of the bag is gripped during this raising process of the two mentioned crossheads, the bag is brought into the elevated position shown in Figure 13.

It is evident that as the fingers 7 recede to the position shown in Figure 12 the bag will fall and its short side will tend to stand out. The outward extension of this unsuported edge of the bag permits the tapered ends of the blades 41 and 42 to enter the bag during its elevating motion. Substantially coincident with the bringing of the bag to the position on the blades shown in Figure 13 the cam 50 revolves into the position necessary to bring the blade 42 to the position shown in Figure 14. The bag is now ready for receiving material, and the cam 72 is so timed in relation to the aforementioned cams that it will cause the plunger 62 to go forward and push a charge of material over the top outlet of the spout 61, into the spout 40, and from there into the open bag by gravity. The cam 26 is so timed in relation to the other cams that it will now revolve to that point where the crossheads 34 and 36 will be returned to the position shown in Figure 10, thereby lowering the bag, releasing it, and permitting it to fall by gravity into the delivery chute 80 which is located in any suitable manner in receiving position. The finger 42 remains in the position shown in Figure 15 until after the bag has been deposited in the delivery chute 80, after which time it will return to the position shown in Figure 10. The cams on the shaft 13 are so timed in relation to each other that each complete revolution of the shaft will produce one complete cycle of the aforementioned events. The delivery chute 80 is shown in the present instance fastened to the side of the case 1, and having an opening in its lower end matching a corresponding opening in the side of the case, as shown in Figure 2.

I wish it understood that the particular form of mechanism with which I have clothed my method, and the different parts thereof illustrated and described, are merely typical means of carrying my method into effect, and that the specific construction described herein is merely by way of illustration and not by limitation or narrowing of my claims, as obviously, changes in construction and design can be made without departing from my invention, and such changes are contemplated by me, and would not involve any departure from my invention.

Having thus described my invention what I claim as new, and desire to secure by Letters Patent, is:—

1. Bag filling apparatus, comprising means for supporting a stack of bags each having a collapsed bottom and an extended lip, gripping means, and means for engaging the collapsed bottom of one of the bags and moving the same into position for engagement of its extended lip by said gripping means.

2. Bag filling apparatus, comprising means for supporting a stack of horizontally disposed bags each having a collapsed bottom and an extended lip, gripping means, and means arranged to engage the collapsed bottom of one of said bags and support and carry the same to a position for engagement of its lip by said gripping means, said bag moving and supporting means being also adapted to recede from said last named position and thereby leave said bag supported solely at its lip by said gripping means.

3. Apparatus for filling bags provided with a collapsed bottom and an extended lip, comprising gripping means, means for moving a bag into position for engagement of its extended lip by said gripping means whereby said bag may be supported in hanging position from said gripping means with its mouth partly open, and a bag opener adapted to enter said bag and open the same.

4. Apparatus for filling bags provided with a collapsed bottom and an extended lip, comprising gripping means, means for moving a bag into position for engagement of its extended lip by said gripping means whereby said bag may be supported in hanging position from said gripping means with its mouth partly open, a bag opener, and means for opening the bag by relative vertical movement between said gripping means and bag opener.

5. Apparatus for filling bags provided with a collapsed bottom and an extended lip, comprising gripping means, means for moving a bag into position for engagement of its extended lip by said gripping means whereby said bag may be supported in hanging position from said gripping means with its mouth partly open, an expansible bag opener, and means for introducing the same into the bag.

6. Apparatus for filling bags provided with a collapsed bottom and an extended lip, comprising gripping means, means for moving a bag into position for engagement of its extended lip by said gripping means whereby said bag may be supported in hanging position from said gripping means with its mouth partly open, an expansible bag opener, and means for introducing the same into the bag by relative vertical motion between said opener and gripping means.

7. Apparatus for filling bags provided with a collapsed bottom and an extended lip, comprising gripping means, means for moving a bag into position for engagement of its extended lip by said gripping means whereby said bag may be supported in hanging position from said gripping means with its mouth partly open, an expansible bag opener, means for introducing the same into the bag by relative vertical motion between said opener and gripping means, and means for actuating said bag opener while in the bag for opening the same.

8. Apparatus for filling bags provided with a collapsed bottom and an extended lip, comprising gripping means, means for moving a bag into position for engagement of its extended lip by said gripping means, commodity supply means, and a bag opening member in communication with said commodity supply means and arranged to enter said bag for opening the same.

9. Apparatus for filling bags provided with a collapsed bottom and an extended lip, comprising gripping means, means for moving the bag into position for engagement of its extended lip by said gripping means, commodity supply means, a bag opening member in communication with said commodity supply means and arranged to enter said bag for opening the same, means for actuating said bag opener with the bag in upright position, and means for actuating said commodity supply means to fill said bag while the opener is therein.

10. In a bag filling mechanism, bags having collapsed bottoms and an extended lip, means to support a stack of bags, a pair of feeding fingers adapted to remove a single bag from the under side of the stack of bags at each operation of same, a pair of jaws operable to grip the extended lip of the bag, when it is carried past the stack of bags, a bag opening mechanism adapted to enter into the bag when so gripped and open same, means to supply a commodity to the opened bag, means to release the bag from the grip of the jaws, and means to deliver the bag so filled to the outside of the mechanism, and an electric motor operable to drive all of said operative means.

11. In a bag filling mechanism, means to support a stack of bags, said bags having collapsed bottoms and extended lips, feeding means consisting of a pair of fingers, mounted for reciprocatory movement of the under side of the stack of bags, means to reciprocate the fingers so that at one movement thereof a bag will be fed from the underside of the stack of bags, gripping means to engage the extended lip, said gripping means adapted to support the bag when the fingers move backward in a reverse direction, and away from the bag so gripped, and a bag opener adapted to enter into the bag and open the bag before the grip of the gripping means is released.

In testimony whereof, I hereunto affix my signature, this 19th day of June, 1928.

GEORGE H. HARTMAN.